Figure 1:
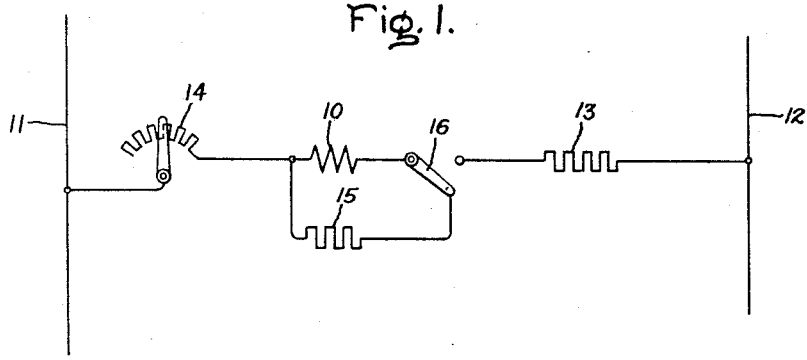

Nov. 5, 1940.  M. A. WHITING  2,220,748
CONTROL SYSTEM
Filed Jan. 12, 1940  2 Sheets-Sheet 1

Inventor:
Max A. Whiting,
by Harry E. Dunham
His Attorney.

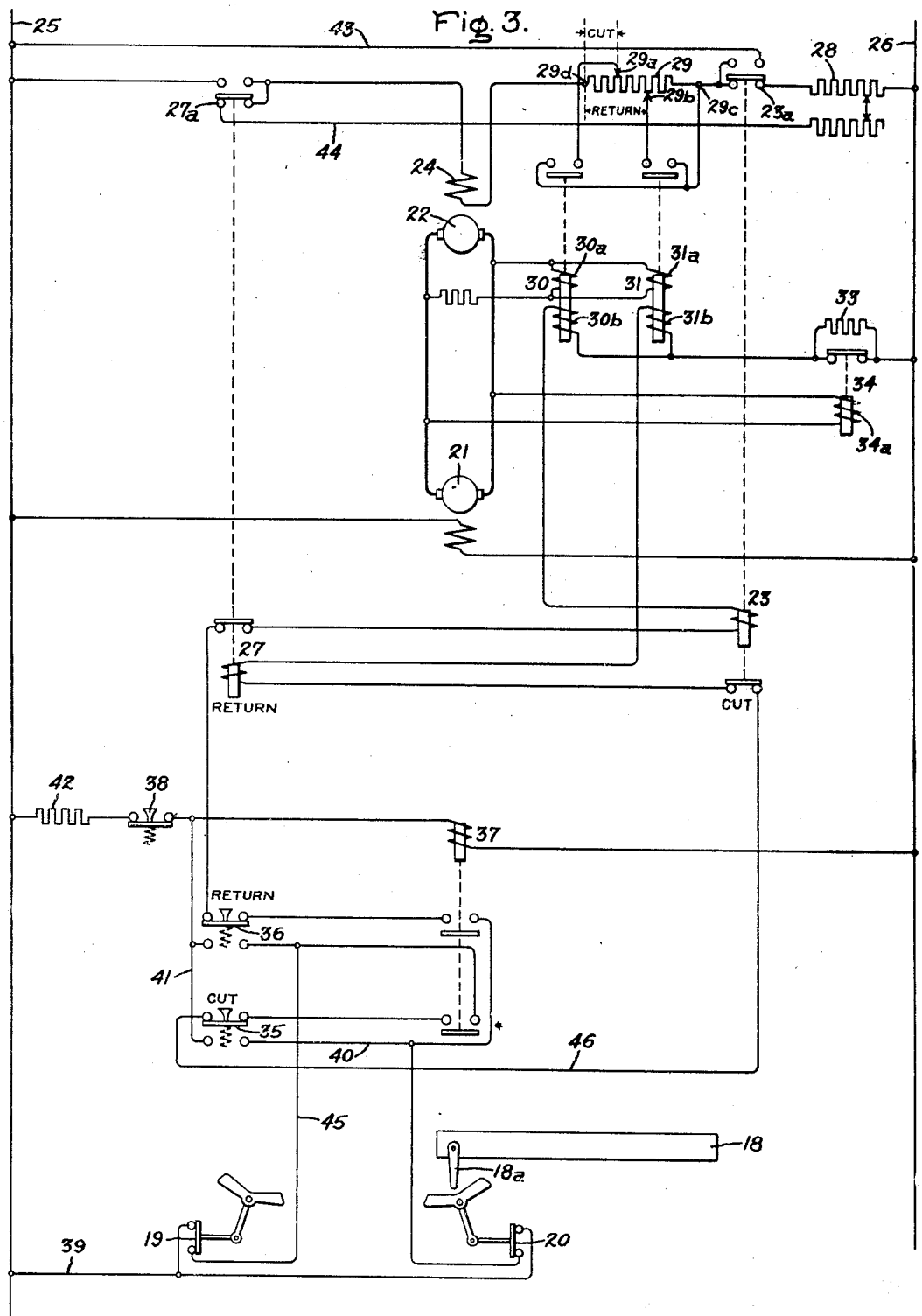

Patented Nov. 5, 1940

2,220,748

UNITED STATES PATENT OFFICE 2,220,748

CONTROL SYSTEM

Max A. Whiting, Schenectady, N. Y., assignor to General Electric Company, a corporation of New York Application January 12, 1940, Serial No. 313,581

9 Claims. (Cl. 172—240)

This invention relates to control systems, more particularly to reversing control systems, and it has for an object the provision of a simple, reliable, and improved control system of this character.

More specifically, the invention relates to reversing control systems in which the excitation of a field winding is to undergo frequency reversal, and in which suitable current limiting devices such as rheostats are provided for controlling the maximum current in each direction. For example, one rheostat will be set to allow the maximum current to flow that is desired for one direction, and the other will be set for the maximum current that is to flow in the reverse direction. Suitable reversing switching means are provided for connecting the winding to a source for excitation first in one direction and then in the other and with the proper rheostat in circuit. During the reversal of connections, that is, after disconnection of the winding from the source and prior to its reconnection in the reverse direction, it has been customary to connect the terminals of the winding to a discharge resistor in which the magnetic stored energy of the winding was discharged and dissipated. Under such conditions the initial rate of decay of the flux when the winding is disconnected is proportional to the amount of current flowing in the winding when it is disconnected from the source, i. e., during the first instant of discharge. Obviously, if the initial rate of decay of flux from the maximum is not excessively great, the initial rates of decay from one-half maximum or one-fourth maximum are much less than the maximum permissible. When the maximum economy of time is important, for example, when it is desired to obtain the largest possible number of reversals per minute between narrowly separated limits of travel, a decay of generator flux which begins at an unnecessarily slow rate results in waste of time and is therefore a handicap. Accordingly, a further and more specific object of this invention is the provision of means for causing the decay of the field flux during each reversal to begin at a high rate, preferably at a rate close to the maximum permissible.

In carrying the invention into effect in one form thereof, a dynamoelectric machine having a field winding is operatively associated with a reversing drive such as the drive for a planer equipment. The field winding is arranged to be connected to a source of supply, and a variable current limiting device, such as a variable resistor is provided for limiting the excitation of the field winding to desired values. Means, such for example as switching devices, are provided for selectively including this current limiting device in circuit with the field winding in accordance with its direction of excitation, and switching means are provided for connecting the field winding to its source of excitation and for subsequently reversing the connections to the source so that the excitation is reversed. During the reversal, a discharge circuit is established for the field winding which includes the current limiting device used to limit the current just prior to the reversal.

Figure 2:
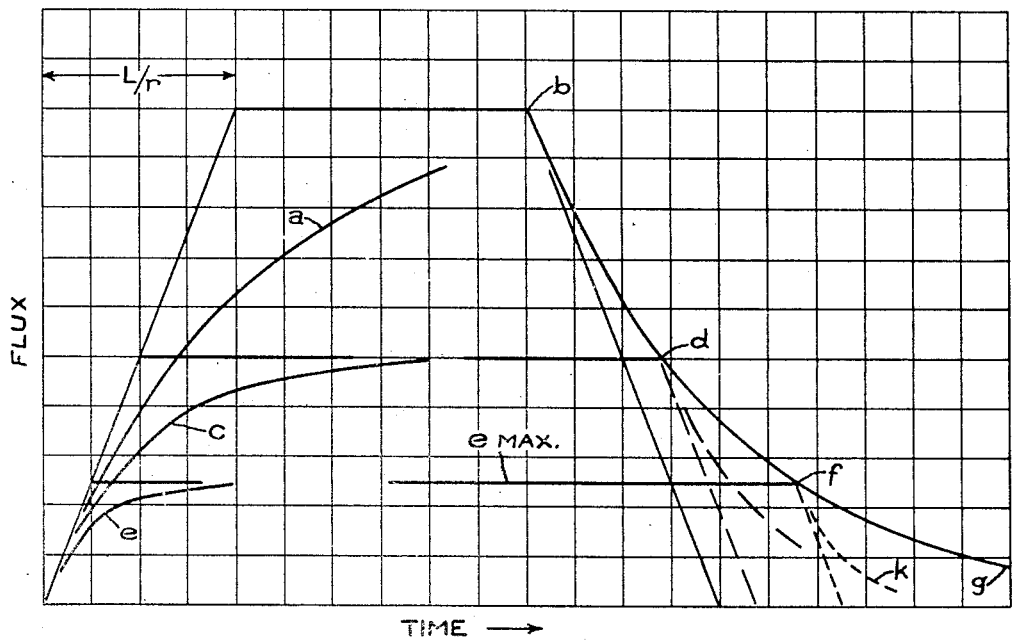

For a better and more complete understanding of the invention, reference should now be had to the following specification and to the accompanying drawings in which Fig. 1 is a simple schematic diagram of a circuit useful in explaining the principle of the invention, and Fig. 2 is a chart of characteristic curves of the rates of rise and decay of flux of the field winding of the circuit of Fig. 1, and Fig. 3 is a simple schematic diagram of an application embodying the invention.

In Fig. 1 the field winding 10 of a Ward-Leonard generator is arranged to be connected to a source of excitation 11 and 12. A permanent series resistor 13 and an adjustable resistor or rheostat 14 are included in series circuit relation with the field winding, and a fixed discharge resistor 15 is provided to be connected in parallel with the field winding to effect its discharge and to dissipate the stored energy. A double throw switch serves to complete and to interrupt the connections of the field winding 10 to the source and to establish the discharge circuit. It may be assumed that the inductance L of the winding 10 remains constant although in practice this is not strictly true.

Let the rheostat 14 be turned to zero resistance and let switch 16 remain closed to discharge resistor 15 until the flux of generator field 10 has become zero. Then close switch 16 to resistor 13. Let the time constant of the circuit as now constituted be $L/r$ as plotted in Fig. 2, in which $r$ is the resistance of the generator field 10 plus the resistance of resistor 13. The rise of the generator magnetic flux will then be in accordance with curve $a$. At time $b$, let switch 16 be quickly opened from resistor 13 and closed to resistor 15, and let the resistance of resistor 15 be equal to the resistance of resistor 13. Then $L/r$ for the new circuit condition will be as shown in Fig. 2 and the decay of the generator flux will be in accordance with curve $b, d, f, g$.

Now, in Fig. 1, turn in enough of rheostat 14 to limit the generator excitation to one-half maximum. Upon closure of switch 16 to resistor 13, the time constant L/r will be one-half its former value. The initial rise of generator flux will begin as rapidly as before and will follow curve c. After steady-state has been obtained, at one-half maximum excitation, let switch 16 be quickly opened from resistor 13 and closed to resistor 15. The time constant L/r is now the same as originally and the decay of flux beginning at d proceeds along curve d, f, g. The initial rate of flux decay, at d, is only one-half the initial rate at b when the decay is from full field.

Similarly, if rheostat 14 has been adjusted to limit the excitation to one-fourth maximum, the initial decay of flux at point f is very slow, only one-fourth of the initial rate at b when decaying from maximum. As previously pointed out when the maximum economy of time is important, for example, when it is desired to obtain the largest possible number of reversals per minute between narrow limits of travel, as in a planer equipment, a decay of generator flux which begins at an unnecessarily slow rate results in waste of time.

In the reversing planer drive illustrated in Fig. 3 the platen 18 is driven in a reciprocating motion between predetermined adjustable limits, which are represented by the limit switches 19 and 20. The platen 18 is driven by motor 21 through suitable gearing (not shown). Motor 21 is supplied from an adjustable voltage generator 22 which is driven by any suitable driving means, such as a squirrel cage induction motor (not shown). Contactor 23 when picked up connects the generator field winding 24 to the source 25, 26 for excitation in the "cut" direction, and contactor 27 operates similarly for the "return" direction. An adjustable resistor 28 may be used, if desired, permanently in series with the generator field. An adjustable resistor 29 having two movable contacts 29a and 29b is also connected in circuit with generator field winding 24. Means illustrated as a pair of electromagnetic switching devices 30 and 31 are provided for selectively short-circuiting portions of resistor 29 and thereby rendering the unshort-circuited portion of the resistor active as a current-limiting device in the field circuit. Switching device 30 short-circuits that portion of resistor 29 between terminal 29c and movable contact 29a, and similarly, switching device 31 short-circuits the portion between terminal 29c and movable contact 29b. When contactor 30 is closed, that portion of the resistor between movable contact 29a and field terminal 29d is active in the field circuit as a current limiting device during the "cut" stroke and may be referred to as the "cut" rheostat. Similarly, the portion between movable contact 29b and terminal 29d is active in the field circuit as a current limiting device during the "return" stroke and may be referred to as the "return" rheostat. In other words, the movable contact 29a of the "cut" rheostat adjusts the "cut" speed, and the movable contact 29b of the "return" rheostat adjusts the "return" speed.

The selective contactors 30 and 31 are provided with auxiliary coils 30a and 31a, respectively, which are energized from the generator voltage. The pull of these coils is insufficient to attract their cores and close their contacts, but once these contacts are closed by their main operating coils 30b and 31b, the auxiliary coils 30a and 31a will maintain the contacts closed until the generator voltage decays to a predetermined low value.

The operating coils of field directional contactors 23 and 27 are connected in series with the main operating coils 30b and 31b, respectively, of the selective contactors 30 and 31. A resistor 33 is included in circuit with these coils and it is controlled by a contactor 34 whose operating coil 34a is energized from the generator voltage. When the generator voltage is lower than a predetermined value, contactor 34 is closed and resistor 33 is short-circuited and one of each of the pairs of contactors can be closed. When the generator voltage is above a predetermined value, contactor 34 is open. Contactors such as 23 and 27 as normally designed require a substantially greater current for "picking up," i. e. closing, than is necessary for holding closed after having been picked up, as is well known in the art. Resistor 33 is of a resistance value low enough not to cause drop-out of contactors 23 and 30 or 27 and 31 if introduced into circuit 11 after pick-up has occurred, but its resistance is high enough so that, if introduced while the contactors are open, i. e. dropped out, it will prevent pick-up from occurring. Thus when any of these contactors is dropped out, it cannot be closed until the generator voltage has decayed to a predetermined low value. Thus contactor 34 protects against "plugging" the field except at relatively low values of generator voltage.

Reversing contactors 23 and 27 are provided with auxiliary contacts 23a and 27a. When both contactors are dropped out, contacts 23a and 27a are closed and the generator field 24 is connected in a discharge circuit.

For the purpose of the present invention, the construction is so arranged that either the "cut" rheostat or the "return" rheostat selectively is in circuit during the principal part of the discharge. Spring return push buttons 35 and 36 are operative upon relay 37 for initiating automatic operation. If button 35 is pressed momentarily, relay 37 picks up and starts the planer in the "cut" direction whereupon automatic operation ensues between the limit switches 19 and 20. Similarly, if push button 36 is pressed, relay 37 is similarly picked up, but automatic operation begins with a movement in the "return" direction. By a momentary opening of push button 36, the automatic operation is interrupted and is not resumed until push button 35 or 36 is pressed.

With the foregoing understanding of the elements and their organization, the operation of the system itself will readily be understood from the following detailed description.

Assume relay 37 to be open and the planer platen 18 to be in any position such that the dog 18a is between limit switches 19 and 20.

To start in the "cut" direction, the push button 35 is depressed. This energizes relay 37. The circuit is traced from side 25 of the source through conductor 39, contacts of limit switch 20, conductor 40, lower contacts of "cut" button 35, conductor 41, coil of automatic relay 37 to side 26 of the source. Relay 37 closes in response to energization. After relay 37 has been picked up, push button 35 may be released because the current through resistor 42 is sufficient to maintain relay 37 picked up, although insufficient to pick it up. In the closed position of relay 37, the operating coils of contactors 23 and 30 are now energized. The circuit is traced from side 25 of the source to conductor 40 as before, thence through the upper contacts of relay 37, normally closed contacts of "return" button 36, lower interlock contacts of "return" contactor 27, coil of "cut" contactor 23, coil 30b of selective contactor 30, resistor 33 to the side 26 of the supply source. Contactor 23 picks up and connects the generator field winding 24 to the source for energization in the "cut" direction, and selective contactor 30, in picking up, short-circiuts the portion 29a—29c of the resistor and leaves section 29a—29d constituting the "cut" rheostat in circuit. The field circuit is traced from side 25 of the source through conductor 43, upper contacts of "cut" contactor section 29a—29d of resistor 29, field winding 24, lower contacts 27a of return contactor, thence through a portion of adjustable resistor 28 to the side 26 of the supply source. The lower contacts of contactor 23 are opened when the contactor picks up thereby providing an additional interruption of the circuit extension from coil of contactor 27. Thus, when "cut" push button 35 is released, the contactor operation is not interfered with.

When the generator voltage rises to a sufficiently high value, contactor 34 will pick up and insert resistor 33 in circuit with the coils of contactors 23, 27, 30 and 31. This prevents contactors 27 and 31 from picking up until the generator voltage again drops to a predetermined low value.

The platen 18 moves to the right. When dog 18a opens limit switch 20, this causes "cut" contactor 23 to drop out. At the instant that cut contactor 23 drops out, its lower auxiliary contact closes and completes a circuit for the operating coils of return contactor 27 and selective contactor 31. However, since the generator voltage is still high, contactor 34 remains picked up and the resistor 33 reduces the energization of these coils so that the contactors 27 and 31 do not pick up. Actually, both "cut" and "return" contactors remain open briefly and provide a discharge circuit for the generator field 24. This discharge circuit extends from the upper terminal of field winding 24 through upper closed contacts 27a of return contactor 27, through conductor 44, portion of resistor 28, contacts 23a of "cut" contactor, contacts of selective contactor 30, "cut" rheostat 29a—29d to lower terminal of field winding 24. It will be noted that the discharge circuit does not include the "return" rheostat 29d—29c which has been and now is short-circuited by the contacts of selective contactor 30.

Assume that when the contactor 23 was closed to connect field winding 24 to the source, the "cut" rheostat was turned in sufficiently to limit the generator voltage to one-fourth maximum. When the contactor 23 closed, the flux of the generator field increased in accordance with curve e of Fig. 2 until the maximum e max. was reached. When the contactor 23 opened to disconnect the field winding 24 from the source and connected it in a discharge circuit including the "cut" rheostat, the flux decayed along the curve f—k. It will be noted that the initial rate of decay is much greater than it would have been in the conventional discharge circuit arrangement which would have been along the curve f—g.

The increased rate of decay which results from making the resistance of the discharge circuit inversely proportional to the current can be explained as follows:

During the rise of the field from zero, the circuit equation is:

$$E - ir - \frac{Nd\phi}{10^8 dt} = 0$$

in which $E$ is the constant bus exciting voltage, $i$ is the field current, $r$ is the total resistance of the field circuit, $N$ is the number of turns of the field winding, and $$\frac{Nd\phi}{10^8 dt}$$

is the self-induced voltage of the field. At the first instant $i$ is zero, and $$\frac{Nd\phi}{10^8 dt} = E$$

For the discharge the circuit equation is:

$$ir = -\frac{Nd\phi}{10^8 dt}$$

At the first instant of discharge $i = i$ max. It is assumed here that the resistance of the discharge circuit has been made equal to the value of $r$ which determined the value of $i$ max.

Therefore, at the first instant of discharge $i_{max}$. $r = E$. Therefore, $$-\frac{Nd\phi}{10^8 dt} = E$$

Thus, the initial rate of decay of flux is equal to the initial rate of rise which it will be noted is much greater than the initial rates of decay for the conventional discharge circuit which began and proceeded along the curve d—f—g.

When the generator voltage has decayed to a sufficiently low value, selective contactor 30 drops out and contactor 34 also drops out and closes its contacts to short-circuit resistor 33. As a result selective contactor 31 and "return" contactor 27 are energized. The circuit is readily traced from side 25 of the source through contacts of limit switch 19, conductor 45, lower contacts of relay 37, normally closed contacts of "cut" push button 35, conductor 46, lower auxiliary contacts of "cut" contactor 23, operating coil of return contactor 27, operating coil 31b of selective contactor 31, contacts of contactor 34 to side 26 of the source.

Contactor 31 closes and short-circuits portion 29b—29c of resistor 29, and "return" contactor 27 closes and connects field winding 24 to the source for excitation in the "return" direction. The circuit is traced from side 25 of the source through upper contacts of "return" contactor, field winding 24, "return" rheostat 29b—29d, resistor 28 to side 26 of the source.

During this time, dog 18a is to the right of the pivot of limit switch 20. Accordingly, this limit switch has remained open. When "return" contactor 27 picks up, its auxiliary contact opens the circuit extension of the coils of "cut" contactor 23 and selective contactor 30 at a second place. Accordingly, when the platen moves toward the left, away from switch 20, the reclosure of limit switch 20 is unable to energize the coils of contactors 23 and 30. Hence the operation of the return movement is not interfered with.

When limit switch 19 is opened by dog 18a, the reversal from "return" to "cut" takes place in a similar manner to that described for the reversal from "cut" to "return". During this reversal, however, the "return" rheostat 29b—29d is included in the discharge circuit and thus the field is again discharged through a circuit of resistance properly related to the initial value of the field to insure initial high rate of flux decay in accordance with the principles set forth hereinbefore.

Although in accordance with the provisions of the patent statutes, this invention is described as embodied in concrete form and the principle of the invention has been explained together with the best mode in which it is now contemplated applying that principle, it will be understood that the elements and connections shown and described are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system for a machinery combination and the like characterized by repeated cyclic reversals comprising in combination, a dynamo electric machine operatively associated with said equipment, said machine having a field winding, a current limiting device operatively associated with said field winding, means for selectively rendering said current limiting device active in accordance with the polarity of the magnetism of said field winding to limit the current flowing in said field winding, and means for reversing the current flowing in said winding when said current limiting device is active, and means for establishing a discharge circuit for said field winding during said reversal including said current limiting device.

2. A control system for a machinery combination and the like characterized by repeated cyclic reversals comprising in combination, a dynamo-electric machine operatively associated with said equipment, said machine having a field winding, a pair of current limiting devices operatively associated with said field winding, means for selectively rendering said current limiting devices active in accordance with the polarity of the magnetism of said field winding to limit the current of said winding, means for reversing the current flowing in said field winding, and means for establishing a selective discharge circuit for said field winding during a reversal including the current limiting device active during the operation immediately preceding said reversal.

3. A reversing control system for planer equipments and the like comprising in combination, a dynamoelectric machine operatively associated with said equipment, said machine having a field winding, a pair of current limiting devices operatively associated with said field winding, switching means for selectively rendering one of said current limiting devices active in accordance with the polarity of the magnetism of said field winding, and switching means for reversing the direction of current flowing in said field winding and for cooperating with said selective switching means to establish a discharge circuit for said field winding during a reversal including the current limiting device active during the operation immediately preceding said reversal.

4. A reversing control system for planer equipments and the like having a reciprocating member comprising an adjustable voltage generator having a field winding, a motor supplied from said generator for driving said equipment, a current limiting device operatively associated with said field winding, switching means responsive to actuation by said equipment for selectively rendering said current limiting device active in accordance with the direction of motion of said reciprocating member, and reversing switching mechanism actuated by said equipment for reversing the direction of current flow in said winding at predetermined points in the travel of said reciprocating member and for establishing a discharge circuit for said field winding during said reversals, the discharge circuit established following the stroke of said member in which said current limiting device was active including said current limiting device.

5. A reversing control for planers and the like having a reciprocating member comprising an adjustable voltage generator provided with a field winding, a motor supplied from said generator for driving said equipment, a pair of adjustable value current limiting devices adapted to be included in circuit with said field winding, reversing switching mechanism responsive to operation of said reciprocating member for reversing the direction of the current in said field winding thereby to effect reversal of the rotation of said motor and reversal of the movement of said member, and switching means responsive to operation of said reversing switching mechanism for selectively including said current limiting devices in said field circuit at the beginning of each stroke of said reciprocating member, said reversing switching mechanism serving to establish a discharge circuit for said field winding during the period of current reversal therein including the current limiting device active in said field circuit during the stroke of said member immediately preceding said reversal.

6. A reversing control system for planer equipment and the like having a reciprocating member comprising an adjustable voltage generator provided with a field winding, a motor supplied from said generator for driving said equipment, a current limiting device adapted to be included in circuit with said field winding, reversing switching mechanism actuated by said reciprocating member for reversing the direction of current flow in said winding thereby to effect reversal of the direction of rotation of said motor and the direction of motion of said member, switching means responsive to actuation by said driven equipment for selectively including said current limiting device in circuit with said field winding during energization of said winding in one direction, said reversing switching mechanism serving to establish a discharge circuit for said field winding including said current limiting device during each of said field current reversals immediately following an operation with said current limiting device in circuit with said field winding.

7. A reversing control system for planer equipments and the like having a reciprocating member comprising an adjustable voltage generator provided with a field winding, a motor supplied from said generator for driving said equipment, a pair of current limiting devices adapted to be included in circuit with said field winding, reversing switching mechanism actuated by said reciprocating member for reversing the direction of current flow in said winding thereby to effect reversal of the direction of rotation of said motor and the direction of motion of said member, switching means responsive to actuation by said member for selectively including said current limiting devices in circuit with said field winding in accordance with the direction of said reciprocating member said reversing switching mechanism serving during each of said reversals to establish a discharge circuit for said field winding including the current limiting device active during the immediately peceding stroke of said member, and means responsive to the generator voltage for preventing interruption of said discharge circuit until the field of said generator has decayed to a predetermined low value.

8. A reversing control system for planer equipments and the like having a member having a forward stroke and a reverse stroke, an adjustable voltage generator provided with a field winding, an electric motor supplied from said generator for driving said member, a pair of variable current limiting devices adapted to be connected in circuit with said field winding thereby to determine the speeds of said forward and reverse strokes, reversing switching mechanism responsive to actuation by said member for interrupting the circuit of said field winding and reversing the flow of current therein, switching mechanism actuated by said equipment for selectively connecting said current limiting devices in circuit with said field winding at the beginning of said strokes, and means responsive to the voltage of said generator for preventing the reversal of current flow in said field winding until said voltage has decreased to a predetermined low value.

9. A reversing control system for planer equipment and the like having a reciprocating member comprising an adjustable voltage generator having a field winding, a motor supplied from said generator for driving said equipment, a pair of adjustable current limiting devices adapted to be connected in circuit with said field winding to control the speed of said motor, means responsive to actuation by said equipment for selectively connecting said current limiting devices in said field circuit so as to provide one speed of said motor for one stroke of said member and a different speed of said motor for the reverse stroke of said member, means for interrupting said generator field circuit at the end of one of said stokes and establishing a discharge circuit for said winding including the current limiting device active during the stroke immediately preceding said circuit interruption and for reversing the direction of current supplied to said winding, and means responsive to said generator voltage for preventing said reversal of current flow and the actuation of said selective means until said generator voltage has decayed to a predetermined low value.

MAX A. WHITING.